(12) United States Patent
Hewicker et al.

(10) Patent No.: US 12,517,062 B2
(45) Date of Patent: Jan. 6, 2026

(54) METHOD AND DEVICE FOR OPTICALLY INSPECTING CONTAINERS IN A DRINKS PROCESSING SYSTEM

(71) Applicant: KRONES AG, Neutraubling (DE)

(72) Inventors: Alexander Hewicker, Woerth an der Donau (DE); Anton Niedermeier, Offenstetten (DE); Herbert Kolb, Hausen (DE)

(73) Assignee: KRONES AG, Neutraubling (DE)

( * ) Notice: Subject to any disclaimer, the term of this patent is extended or adjusted under 35 U.S.C. 154(b) by 437 days.

(21) Appl. No.: 17/997,010

(22) PCT Filed: Mar. 29, 2021

(86) PCT No.: PCT/EP2021/058070
§ 371 (c)(1),
(2) Date: Oct. 24, 2022

(87) PCT Pub. No.: WO2021/213779
PCT Pub. Date: Oct. 28, 2021

(65) Prior Publication Data
US 2023/0177671 A1    Jun. 8, 2023

(30) Foreign Application Priority Data

Apr. 24, 2020  (DE) ...................... 10 2020 111 255.6
Mar. 22, 2021  (DE) ...................... 10 2021 106 999.8

(51) Int. Cl.
*G06V 10/00* (2022.01)
*G01N 21/88* (2006.01)
(Continued)

(52) U.S. Cl.
CPC ..... *G01N 21/9036* (2013.01); *G01N 21/8851* (2013.01); *G01N 21/90* (2013.01);
(Continued)

(58) Field of Classification Search
CPC ........... G01N 21/9036; G01N 21/8851; G01N 21/90; G01N 2021/888; G01N 2021/8883;
(Continued)

(56) References Cited

U.S. PATENT DOCUMENTS

2017/0200260 A1* 7/2017 Bhaskar ............ G06F 18/24133
2019/0073568 A1* 3/2019 He ......................... G06F 18/40

FOREIGN PATENT DOCUMENTS

CN         109509172 A        3/2019
DE         4200546 A1         7/1993
(Continued)

OTHER PUBLICATIONS

Metzner ("Automated Optical Inspection of Soldering Connections in Power Electronics Production Using Convolutional Neural Networks," Proceedings of the 2019 9th International Electric Drives Production Conference (EDPC), Dec. 3, 2019, Erlangen, Germany, 6 pages) (Year: 2019).*

(Continued)

*Primary Examiner* — Ping Y Hsieh
(74) *Attorney, Agent, or Firm* — McCoy Russell LLP (57) ABSTRACT

A method for optically inspecting containers in a drinks processing system, wherein the containers are transported as a container mass flow using a transporter and captured as camera images by an inspection unit arranged in the drinks processing system, and wherein the camera images are inspected for faults by a first evaluation unit using a conventional image processing method, wherein the camera images with faulty containers are classified as fault images and the faults are correspondingly assigned to the fault images as fault markings, wherein the camera images with containers considered to be good quality are classified as fault-free images, the fault images, the fault markings and (Continued)

the fault-free images are compiled as a specific training data set, and wherein, using the specific training data set, a second evaluation unit is trained in situ with an image processing method working on the basis of artificial intelligence.

12 Claims, 3 Drawing Sheets

(51) Int. Cl.
*G01N 21/90* (2006.01)
*G06T 7/00* (2017.01)
*G06V 10/764* (2022.01)
*G06V 10/774* (2022.01)
*G06V 10/776* (2022.01)

(52) U.S. Cl.
CPC .......... *G06T 7/0004* (2013.01); *G06V 10/764* (2022.01); *G06V 10/774* (2022.01); *G06V 10/7747* (2022.01); *G06V 10/776* (2022.01); *G01N 2021/888* (2013.01); *G06T 2207/20081* (2013.01)

(58) Field of Classification Search
CPC ......... G06T 7/0004; G06T 2207/20081; G06T 2207/20084; G06T 2207/30164; G06V 10/764; G06V 10/774; G06V 10/7747; G06V 10/776; G06V 2201/06; G06F 18/214
See application file for complete search history.

(56) References Cited

FOREIGN PATENT DOCUMENTS

| | | |
|---|---|---|
| DE | 69401923 T2 | 11/1997 |
| DE | 202004007783 U1 | 10/2005 |
| DE | 102014216188 A1 | 2/2016 |
| DE | 102015218356 A1 | 3/2017 |
| DE | 102018211212 A1 | 1/2019 |
| DE | 102019123801 A1 | 3/2020 |
| WO | WO-2020017427 A1 * | 1/2020 ............. G06N 20/00 |

OTHER PUBLICATIONS

Metzner, M. et al., "Automated Optical Inspection of Soldering Connections in Power Electronics Production Using Convolutional Neural Networks," Proceedings of the 2019 9th International Electric Drives Production Conference (EDPC), Dec. 3, 2019, Esslingen, Germany, 6 pages.

ISA European Patent Office, International Search Report Issued in Application No. PCT/EP2021/058070, Jun. 22, 2021, WIPO, 5 pages.

"Künstliche Intelligenz (Artificial intelligence)," Wikipedia Website, Available Online at https://de.wikipedia.org/wiki/K%C3%BCnstliche_Intelligenz, Page Created Nov. 6, 2001, 67 pages. (Submitted with Machine Translation).

Davies. E., "Chapter 22: Automated Visual Inspection," Machine Vision—Theory, Algorithms, Practicalities, 3rd Edition, Morgan Kaufmann, Dec. 31, 2005, 31 pages.

Bahaghighat, M. et al., "Vision Inspection of Bottle Caps in Drink Factories Using Convolutional Neural Networks," Proceedings of the 2019 IEEE 15th International Conference on Intelligent Computer Communication and Processing (ICCP), Sep. 5, 2019, Cluj-Napoca, Romania, 5 pages.

China National Intellectual Property Administration, Office Action and Search Report Issued in Application No. 202180030074.8, May 1, 2025, 57 pages.

\* cited by examiner

METHOD AND DEVICE FOR OPTICALLY INSPECTING CONTAINERS IN A DRINKS PROCESSING SYSTEM

CROSS REFERENCE TO RELATED APPLICATIONS

The present application is a U.S. National Phase of International Application No. PCT/EP2021/058070 entitled "METHOD AND DEVICE FOR OPTICALLY INSPECTING CONTAINERS IN A DRINKS PROCESSING SYSTEM," and filed on Mar. 29, 2021. International Application No. PCT/EP2021/058070 claims priority to German Patent Application No. 10 2020 111 255.6 filed on Apr. 24, 2020, and to German Patent Application No. 10 2021 106 999.8 filed on Mar. 22, 2021. The entire contents of each of the above-listed applications are hereby incorporated by reference for all purposes.

TECHNICAL FIELD

The invention relates to a method and a device for optically inspecting containers in a drinks processing system.

BACKGROUND AND SUMMARY

Typically, such methods and devices are used to inspect the containers, for example, for contamination and/or faults. For this purpose, the containers are transported by a transporter as a container mass flow and are captures as camera images by an inspection unit arranged in the drinks processing system. The camera images are then inspected for faults by a first evaluation unit using conventional image processing methods. Upon detection of a fault, such as contamination or a defect in a container, the container is cleaned or recycled.

For example, such methods and devices for the optical inspection of containers are used for the sidewall, base and/or fill level inspection of empty containers or containers already filled with a product. It is also conceivable that such methods and devices for the optical inspection of containers in drinks processing systems are used to detect processing faults during treatment in the drinks processing system. For example, whether a container has fallen over during transport or a jam is forming.

DE 10 2014 216188 A1 discloses an optical inspection method and an optical inspection device for containers.

Usually, the camera images are evaluated by conventionally operating image processing methods using transformation operations, point operations, neighbourhood operations, filter operations, histogram operations, threshold operations, brightness operations and/or contrast operations to thereby directly detect image areas in the camera images that have the contaminations and/or faults.

The disadvantage here is that conventionally operating image processing methods usually have to be set up by experts for the different types of containers that are handled by the drinks processing system, which is time-consuming and costly.

Furthermore, image processing methods based on artificial intelligence, for example a neural network, in particular a deep neural network, are increasingly being used to evaluate camera images.

The disadvantage is that such neural or deep neural networks have to be trained with a training data set comprising 1000-10000 or even more marked images, in each of which, for example, the faults are marked. Marking is usually done by image processing experts and/or trained staff at the manufacturer of the drinks processing system. This is also time-consuming and costly.

It is therefore the object of the present invention to provide a method and a device for optically inspecting containers in a drinks processing system, in which the setup of the image processing method is less time-consuming and cost-intensive.

To address this problem object, the invention provides a method for optically inspecting containers in a drinks processing system.

By classifying the camera images of the faulty containers as fault images and by correspondingly associating the faults to the faults images as fault markings, and by classifying those of the camera images with containers found to be good as fault-free images, a large number of fault images and fault-free images may be provided on the basis of the conventionally operating image processing method. This may be accomplished, for example, in the drinks processing system with container types, for which the conventionally operating image processing method has been set up and thus works particularly reliably. Subsequently, a specific training data set is compiled from the fault images, the fault markings and the fault-free images, and this is used to train on site the second evaluation unit with the image processing method operating on the basis of artificial intelligence. Consequently, the specific training data set may be provided automatically to the greatest possible extent, making the method particularly time-efficient and thus cost-effective.

The optical inspection method may precede, follow or be assigned with a container manufacturing process, cleaning process, filling process and/or closure process. For example, the method may be used in a full bottle or empty bottle inspection machine comprising the inspection unit.

The containers may be designed to hold beverages, food products, hygiene products, pastes, chemical, biological and/or pharmaceutical products. The containers may be in the form of bottles, particularly plastic bottles or glass bottles. In particular, plastic bottles may be PET, PEN, HD-PE or PP bottles. It is also conceivable that the containers are preforms for manufacturing the plastic bottles. Likewise, they may be biodegradable containers or bottles whose main components are made from renewable raw materials, such as sugar cane, wheat or corn. The containers may be provided with a closure, for example, a crown cork, screw cap, tear-off cap, or the like. Likewise, the containers may be present as empties, preferably without a closure.

Conceivably, the method may be used to check the sidewall, base, mouth, contents and/or fill level of the containers. The faults may be contaminants, such as foreign bodies, product residues, residues of labels and/or the like. They may also be defects, such as damage to the containers, in particular cracks and/or chipped glass. It is likewise conceivable that it is a matter of defectively produced material spots, such as local material thinning and/or thickening. It is also conceivable that the method is used to inspect returned returnable containers and/or to monitor the transport of the containers as a container mass flow and/or to monitor the processing of the containers in the drinks processing system, for example to detect containers that have fallen over on the transporter or to detect a jam.

The containers may be transported with the transporter to the inspection unit as the container mass flow, preferably as a single-lane container mass flow. However, a multi-lane container mass flow is also conceivable. The transporter may include a carousel and/or a linear conveyor. It is conceivable, for example, that the transporter includes a conveyor belt, on which the containers are transported standing up in an inspection area of the inspection unit. It is also conceivable to have receiving elements that receive one or more containers during transport. The containers may also be transported held by lateral belts when, for example, the lighting illuminates the container bottom and the camera inspects the bottom through the container mouth.

The inspection unit may be configured as an optical inspection unit, in particular with an illumination device and/or with a camera to transilluminate and/or illuminate the containers. In the illumination device, the light may be generated with at least one light source, for example with an incandescent bulb, a fluorescent tube and/or with at least one LED, in order to backlight a light emitting surface. Preferably, the light may be generated with a matrix of LEDs and emitted in the direction of the light emitting surface. The light emitting surface may be formed so as to be larger than the camera view of the container. Likewise, it is conceivable that the light emitting surface illuminates only a portion of the camera view of the container. The light emitting surface may emit the light partially or completely diffusely. Preferably, the light emitting surface may comprise a diffusing plate with which the light from the at least one light source is diffusely scattered two-dimensionally towards the camera. Conceivably, the light is generated by the illumination device, subsequently shines through and/or reflects off the containers, and is then detected by the camera.

Using a lens and an image sensor the camera may capture a partial area of a container, precisely one container or several containers, respectively and optionally the light transmitted or reflected therefrom. The image sensor may be, for example, a CMOS or a CCD sensor. It is conceivable that the camera transmits the camera images to the first and/or second evaluation units by means of a data interface.

The containers may each be captured in the camera images from one or more image perspectives. The camera may detect the polarization property, the intensity property, the color property and/or the phase property of the light for each pixel of the camera images.

The first and/or second evaluation units may process the camera images with a signal processor and/or with a CPU (Central Processing Unit) and/or GPU (Graphics Processing Unit) and/or with a TPU (Tensor Processing Unit) and/or with a VPU (Vision Processing Unit). It is also conceivable that the first and/or second evaluation units include a memory unit, one or more data interfaces, for example a network interface, a display unit and/or an input unit. The conventionally operating image processing method and/or the image processing method operating on the basis of artificial intelligence may be implemented in the first and/or second evaluation units, in particular in the respective memory unit, as a computer program product.

"Conventionally operating image processing method" may mean here that the conventionally operating image processing method is not based on artificial intelligence. In particular, this may mean that the conventionally operating image processing method does not include a process step using a neural network, in particular a process step using a deep neural network. It is also conceivable that this means that the conventionally operating image processing method evaluates the camera images with transformation, point, neighborhood, filter, histogram, threshold, brightness and/or contrast operations in order to use them to directly detect image regions in the camera images that include the faults.

"Faulty containers" may indicate containers that include a fault. "Fault markings" may indicate here that a list of fault images with assigned fault descriptions is provided. Likewise, it may indicate that the fault markings are entered into the metadata of the respective fault images. More generally, this may represent mean any indicator that the fault image shows a fault. Likewise, it may mean fault coordinates of the faults in the fault images, such as the coordinate of a contaminant. The term "containers found to be good" may indicate containers without faults or with a tolerable deviation.

"Image processing method operating on the basis of artificial intelligence" may mean here that the image processing method operating on the basis of artificial intelligence includes at least one method step with a neural network, in particular with a deep neural network. For example, it may be a so-called convolutional neural network with at least one convolutional layer and with a pooling layer.

"On site" may mean that the second evaluation unit is trained on site or in-situ by the operator of the drinks processing system with the training data set, in particular on site at the drinks processing system.

It is conceivable that, in a first step, the second evaluation unit with the image processing method operating on the basis of artificial intelligence is trained at a manufacturer of the drinks processing system with a generic training data set and that, subsequently, in a second step, the second evaluation unit with the image processing method operating on the basis of artificial intelligence is trained on site with the specific training data set. In this way, the second evaluation unit may first be trained with data available at the manufacturer of the drinks processing system and then be further trained on site in the drinks processing system. Consequently, particularly extensive data is available for training. The manufacturer of the second evaluation unit may also refer to the manufacturer of the drinks processing system, the inspection unit and/or the first evaluation unit. The "generic training data set" may represent a compilation of fault images, fault markings and/or fault-free images with container types known to the manufacturer of the second evaluation unit. In contrast, the specific training data set may be the fault images, the fault markings, and the fault-free containers of container types known to the operator of the drinks processing system.

It is conceivable that the training of the second evaluation unit is performed with lower priority than the capture of the containers by the inspection unit and/or the inspection of the camera images by the first evaluation unit, in order to use unused resources of a computer system during the inspection. Thus, training may be performed during the inspection of the containers without affecting the acquisition of the camera images and/or the resources used during the inspection by the first evaluation unit. Consequently, the computer system may thus be used particularly effectively. The computer system may be a machine controller or a PC. The term "lower priority" may mean a processing priority by the computer system.

It is conceivable that a recognition performance of the second evaluation unit is determined on the basis of a verification data set, and if the recognition performance exceeds a predetermined threshold value, that the camera images are inspected for the faults by the second evaluation unit using the image processing method operating on the basis of artificial intelligence. As a result, it is possible to automatically switch from inspection by the first evaluation unit to the second evaluation unit when the predetermined threshold value is reached. The inspection data set may contain further fault images, fault markings and/or fault-free images that are not included in the specific training data set and/or in the generic training data set. Consequently, it may be verified that the artificial intelligence-based image processing method also operates reliably for containers that were not inspected for the generic and/or specific training data set.

It is conceivable that the camera images are inspected by the second evaluation unit instead of the first evaluation unit. In this way, resources may be used particularly efficiently for the second evaluation unit.

Alternatively, it is conceivable that the camera images are additionally inspected by the first evaluation unit in parallel with the second evaluation unit in order to detect still unknown faults with the aid of the conventionally operating image processing method for the image processing method operating on the basis of artificial intelligence. This makes it possible to additionally determine the unknown faults and increase the reliability of the evaluation. "Faults still unknown for the image processing method working on the basis of artificial intelligence" may mean faults that have not been classified and compiled as fault images and/or assigned fault markings for the specific training data set. The evaluation sensitivity of the first evaluation unit may be reduced or set to default parameters to prevent false rejections.

Those of the camera images with containers having the unknown faults may be classified as further fault images and the unknown faults may be assigned accordingly as further fault markings to the further fault images, wherein the further fault images and the further fault markings may be compiled as a further specific training data set, and wherein the second evaluation unit may be trained on site with the image processing method operating on the basis of artificial intelligence using the further specific training data set. In this way, the recognition performance of the second evaluation unit using the image processing method operating on the basis of artificial intelligence may be further increased. It is conceivable that the parallel inspection of the camera images by the first evaluation unit and the second evaluation unit, the classification of those camera images with the containers with the unknown faults, the compilation of the further specific training data set, and the further training of the image processing method operating on the basis of artificial intelligence are carried out on site iteratively further, in particular until a further recognition performance determined for the second evaluation unit exceeds a predetermined further threshold value.

It is conceivable that the faulty containers are sorted out of the container stream. This allows them to be excluded from further treatment steps and recycled or disposed of.

Furthermore, in order to address the above-mentioned object, the invention provides a device for optically inspecting containers in a drinks processing system.

By configuring the classification unit so as to classify those of the camera images with the faulty containers as fault images and to assign the faults accordingly as fault markings to the fault images, and to classify those of the camera images with containers found to be good as fault-free images, a large number of fault images and fault-free images may be provided based on the conventionally operating image processing method. This may be done, for example, in the drinks processing system with container types, for which the conventionally operating image processing method has been set up and thus operates particularly reliably. Since the classification unit is configured to compile the fault images, the fault markings and the fault-free images as a specific training data set, the specific training data set may be provided for training the second evaluation unit as automatically as possible, which means that the method is particularly time-efficient and thus cost-effective.

The second evaluation unit may be configured to inspect the camera images for the faults using the image processing method based on artificial intelligence. As a result, when the predetermined threshold value described above is exceeded, it is then possible to switch automatically from the first evaluation unit to the second evaluation unit in order to inspect the camera images for the faults by the second evaluation unit using the image processing method based on artificial intelligence. However, it is also conceivable that the first evaluation unit and the second evaluation unit inspect the camera images in parallel with each other to increase an overall recognition rate.

The device may be arranged in the drinks processing system. Consequently, the second evaluation unit is thus trained with the artificial intelligence-based image processing method on site at the drinks processing system. "On site" may thus mean that the second evaluation unit is trained on site at the drinks manufacturer by using the training data set.

The device may include a computer system having the first evaluation unit and the second evaluation unit. Thus, the first evaluation unit and the second evaluation unit may be implemented as a computer program product. It is also conceivable that the computer system includes the classification unit. Thereby, the classification unit may also be implemented as a computer program product. The computer system may include the signal processor and/or the CPU (Central Processing Unit) and/or the GPU (Graphics Processing Unit) and/or the TPU (Tensor Processing Unit) and/or the VPU (Vision Processing Unit). It is also conceivable that the computer system includes the memory unit, the one or more data interfaces, the network interface, the display unit, and/or the input unit.

The inspection unit, the first evaluation unit, the second evaluation unit and/or the classification unit may be interconnected via a digital data link, in particular to transmit the camera images, the fault images, the fault markings, the fault-free images, the specific training data set and/or the generic training data set.

BRIEF DESCRIPTION OF THE FIGURES

Further features of the invention are explained in more detail below with reference to the embodiments shown in the figures. In the Figures.

DETAILED DESCRIPTION

Figure 1:
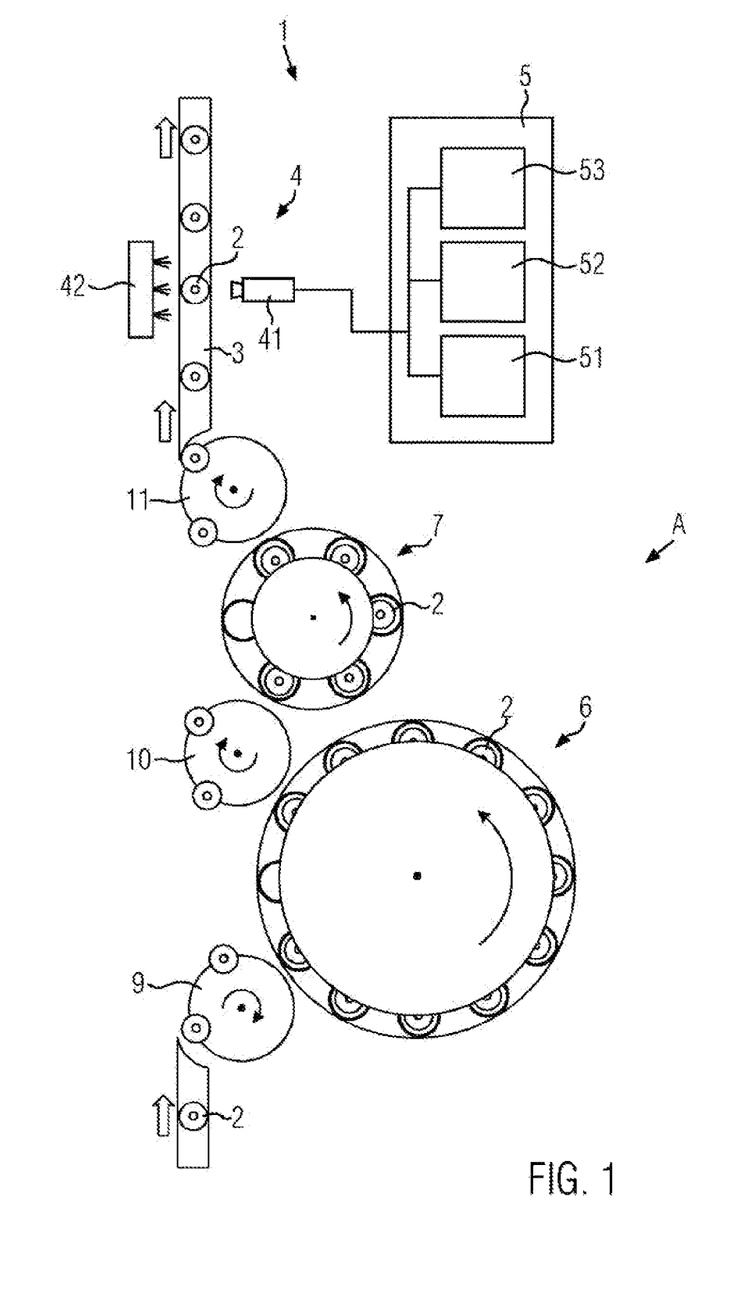
FIG. 1 shows a top view of an embodiment of a device for optically inspecting containers in a drinks processing system according to the invention.

In FIG. 1, there is shown as a top view an embodiment according to the invention of a device 1 for optically inspecting containers 2 in a drinks processing system A. The device 1 is configured for carrying out the method 100 in FIGS. 2A-2B described below.

It is evident that the containers 2 are first transferred to the filler 6 by the inlet starwheel 9, where they are filled with a flowable product. The filler 6 includes, for example, a carousel with filling elements arranged thereon (not shown here), with which the containers 2 are filled with the flowable product during transport. Subsequently, the containers 2 are transferred via the intermediate starwheel 10 to the capper 7, where they are provided with a closure, for example with a cork, crown cork or screw cap. This protects the free-flowing product in the containers 2 from environmental influences and prevents it from leaking out of the containers 2.

Subsequently, the containers 2 are transferred via the discharge starwheel 11 to the transporter 3, which transports the containers 2 as a container mass flow to the inspection unit 4. The transporter is configured here as an example as a conveyor belt, on which the containers 2 are transported upright. The inspection unit 4 arranged thereon includes the illumination device 42 and the camera 41, with which the containers 2 may be captured in transmitted light. The illumination device 42 has, for example, a diffusing light-emitting disc that is backlit by a plurality of LEDs and that thus forms an illuminated image background for the containers 2 as seen by the camera 41. The camera 41 then captures the containers 2 as camera images being forwarded to the computer system 5 as a digital data signal.

Alternatively or additionally, it is conceivable that the containers 2 are captured with another illumination device in reflected light.

Furthermore, the computer system 5 is shown with the first evaluation unit 51, the second evaluation unit 52 and with the classification unit 53. The computer system 5 includes, for example, a CPU, a memory unit, an input unit, an output unit, and a network interface. Accordingly, the first evaluation unit 51, the second evaluation unit 52, and the classification unit 53 are implemented as a computer program product in the computer system 5.

The first evaluation unit 51 is configured to inspect the camera images for faults using a conventionally operating image processing method, for example inspecting for the filling level and/or contamination.

Furthermore, the classification unit 53 is configured to classify those of the camera images representing the faulty containers as fault images, to assign the faults accordingly to the fault images as fault markings, and to classify those of the camera images with containers that are found to be good as fault-free images. In addition, the classification unit 53 is configured to compile the fault images, the fault markings, and the fault-free images as a specific training data set.

The second evaluation unit 52 is configured to perform an image processing method based on artificial intelligence and to train it on site with the specific training data set.

During the inspection, the first evaluation unit 51 first captures the camera images of the containers 2 and classifies them by means of the classification unit 53 so that the specific training data set may be compiled therefrom. Subsequently, the second evaluation unit 52 is then trained with the specific training data set on site in the drinks processing system A.

Subsequently, the inspection may then be performed alternatively or additionally with the aid of the second evaluation unit 52. Accordingly, the second evaluation unit 52 is configured to inspect the camera images for the faults using the image processing method based on artificial intelligence.

The fault-free containers 2 are subsequently fed to further processing steps, for example to a palletizer. In contrast, faulty containers are diverted out of the container mass flow by means of a diverter and then recycled or disposed of.

The operation of the first evaluation unit 51, the second evaluation unit 52 and the classification unit 53 are described in more detail below with reference to FIGS. 2A-2B.

Figure 2A:
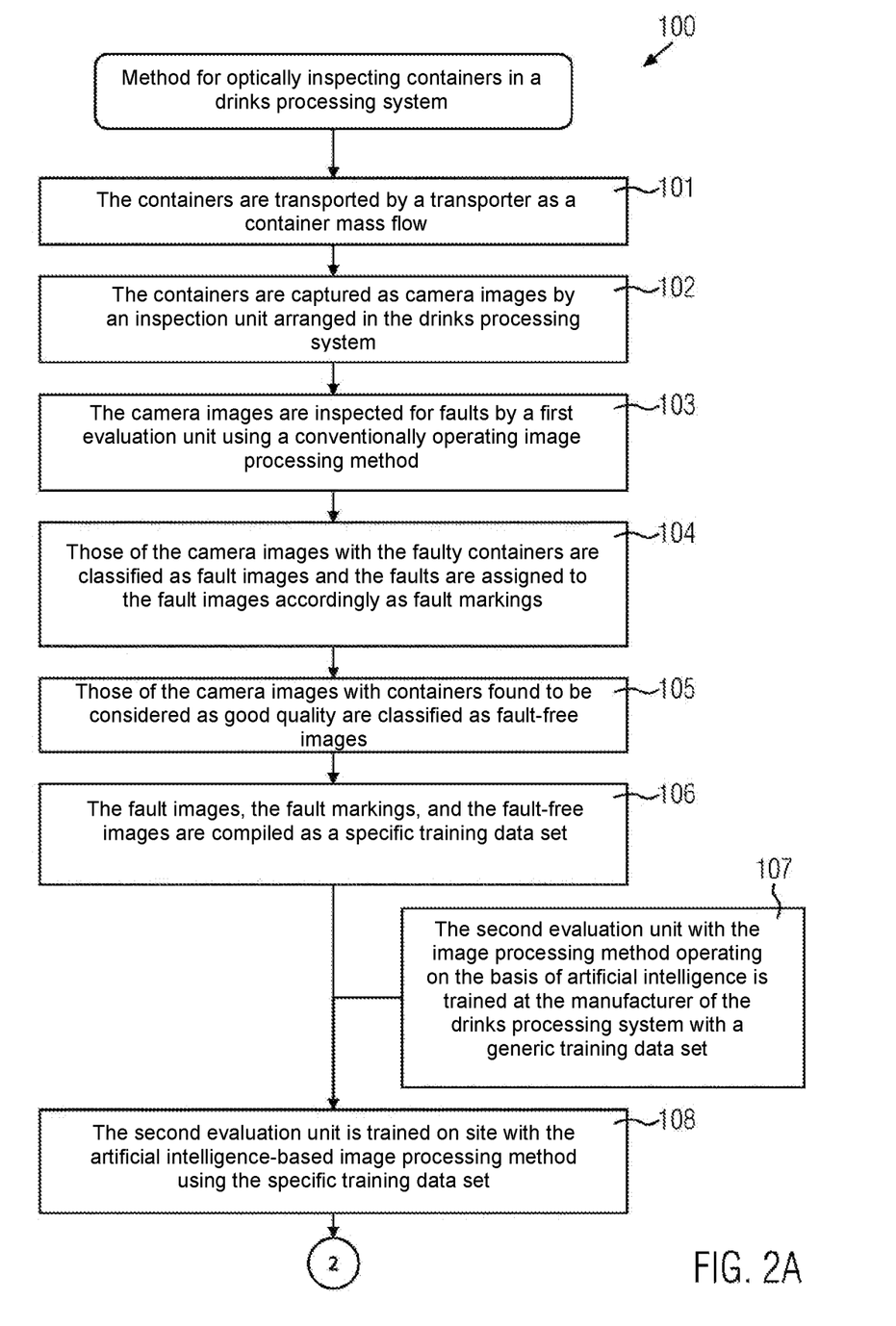
FIGS. 2A-2B show an embodiment according to the invention representing a method for optically inspecting containers in a drinks processing system as a flow diagram.
Figure 2B:
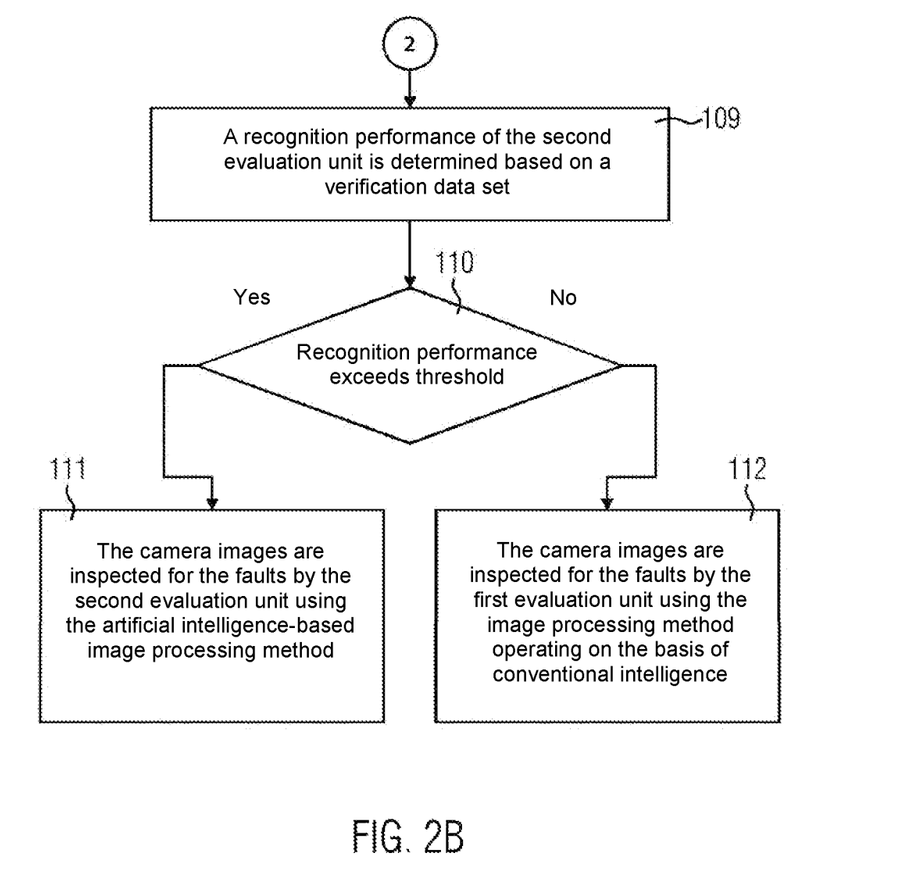

FIGS. 2A-2B show, as a flow diagrams, an embodiment according to the invention representing a method 100 for optically inspecting containers 2 in a drinks processing system A. The method 100 is described only by way of example with reference to the device 1 for optical inspection previously described with reference to FIG. 1.

First, in step 101, the containers 2 are transported by the transporter 3 as a container mass flow. This is done, for example, by means of a conveyor belt or a carousel.

In the subsequent step 102, the containers 2 are captured as camera images by the inspection unit 4 arranged in the drinks processing system. In this process, the containers 2 are, for example, transilluminated by the illumination unit 42 and captured as camera images in transmitted light by the camera 41. However, it is also conceivable that the containers 2 are additionally or alternatively illuminated in incident light and captured as camera images by the camera 41.

In step 103 the camera images are then inspected for faults by the first evaluation unit 51 using a conventionally operating image processing method. The "conventionally operating image processing method" here refers to a method without artificial intelligence, for example by evaluating the camera images by means of filter and threshold operations in order to detect faults, such as a faulty fill level and/or contamination. For this purpose, for example, an edge filter is used to filter out the surface of the liquid product from the camera images.

Subsequently, in step 104, those of the camera images with the faulty containers 2 are then classified as fault images and the faults are assigned to the fault images accordingly as fault markings. For example, a fill level and/or a defect indicator may be entered as a fault marking in the fault images, in particular in their metadata.

Furthermore, in step 105, the classification unit 53 classifies those of the camera images with containers 2 found to be good as fault-free images.

Accordingly, the fault images, the fault markings, and the fault-free images are then compiled as a specific training data set (step 106).

These steps 104-106 are performed using the classification unit 53, for example Then, in step 108, the second evaluation unit 52 is trained on site with the artificial intelligence-based image processing method using the specific training data set. For example, a deep neural network of the second evaluation unit is trained with the specific training data set.

As shown in step 107, it is additionally conceivable that the second evaluation unit 52 with the image processing method operating on the basis of artificial intelligence is trained beforehand at the manufacturer of the drinks processing system with a generic training data set available there. As a result, container types and fault images already known at the manufacturer of the drinks processing system may be imported in order to train the image processing method operating on the basis of artificial intelligence in advance and then to train it further with the specific training data set on site in the drinks processing system A. As a result, the artificial intelligence-based image processing method is further trained on the specific types of containers present at the drinks processing system.

In addition, in step 109, the recognition performance of the second evaluation unit 52 is determined based on a verification data set. For this purpose, the verification data set may include additional fault images, fault markings, and fault-free images that are not present in either the generic training data set or the specific training data set. Consequently, it may be determined whether the second evaluation unit is operating reliably.

When the recognition performance exceeds a predetermined threshold in step 110, the camera images may be inspected for the faults by the second evaluation unit 52 using the artificial intelligence-based image processing method in step 111. This may be done either alternatively or in addition to the evaluation with the first evaluation unit 51.

By performing an evaluation alternatively by the second evaluation unit, it is possible through the artificial intelligence to ensure a reliable recognition performance without a time-consuming parameterization of the classical image processing methods by an expert.

If, on the other hand, the camera images are additionally inspected by the first evaluation unit 51 in parallel with the second evaluation unit 52, it is possible to detect still unknown faults for the image processing method operating on the basis of artificial intelligence by using the conventionally operating image processing method. This makes it possible to increase the reliability of the evaluation. The evaluation sensitivity of the first evaluation unit 51 may thereby be reduced or set to standard parameters in order to prevent false rejections. It is conceivable that those of the camera images representing containers 2 with the unknown faults are classified as further fault images and the unknown faults are correspondingly assigned to the further fault images as further fault markings, wherein the further fault images and the further fault markings are compiled as a further specific training data set, and wherein the second evaluation unit 52 is further trained with the image processing method operating on the basis of artificial intelligence by using the further specific training data set on site. As a result, the recognition performance of the second evaluation unit 52 with the image processing method operating on the basis of artificial intelligence may be further increased.

On the other hand, if the recognition performance does not exceed the predetermined threshold value in step 110, the camera images according to step 110 are still inspected for the faults by the first evaluation unit 51 using the image processing method operating on the basis of conventional intelligence. In doing so, the classification unit 53 may further classify the camera images according to steps 104 and 105 and add further fault images, fault markings and fault-free images to the specific training data set or create another specific training data set. This may then be used, according to step 108, to further train the second evaluation unit 52 until the recognition performance in step 110 exceeds the predetermined threshold.

It is also conceivable that the training of the second evaluation unit 52 in step 108 is performed with lower priority than the capture of the containers with the inspection unit 4 in step 102 and/or the inspection of the camera images with the first evaluation unit 51 in step 103, in order to use unused resources of a computer system 5 during the inspection.

By classifying the camera images with the defective containers 2 as fault images and correspondingly assigning the defects as fault markings to the fault images, and classifying those of the camera images with containers 2 found to be good as fault-free images, a large number of fault images and fault-free images may be provided based on the conventionally operating image processing method. This may be done, for example, in the drinks processing system A with container types, for which the conventionally operating image processing method has been set up and thus operates particularly reliably. Subsequently, a specific training data set is compiled from the fault images, the fault markings and the fault-free images, and the second evaluation unit 52 is thus trained on site with the image processing method operating on the basis of artificial intelligence. Consequently, the specific training data set may be provided automatically to the greatest extent possible, whereby the method 100 operates in a particularly time- and thus cost-effective manner.

It is understood that features mentioned in the previously described embodiment are not limited to these feature combinations, but may also be implemented individually or in any other feature combinations.

The invention claimed is:

1. A method for optically inspecting containers in a drinks processing system, wherein the containers are transported by a transporter as a container mass flow and are captured as camera images by an inspection unit arranged in the drinks processing system, and wherein the camera images are inspected for faults by a first evaluation unit using a conventionally operating image processing method,
wherein
the camera images with faulty containers are classified as fault images and the faults are correspondingly assigned to the fault images as fault markings,
the camera images with containers that are found to be good are classified as fault-free images,
the fault images, the fault markings and the fault-free images are compiled as a specific training data set, and
a second evaluation unit with an image processing method operating on the basis of artificial intelligence is trained on site with the specific training data set,
wherein in a first step the second evaluation unit with the image processing method operating on the basis of artificial intelligence is trained at a manufacturer of the second evaluation unit with a generic training data set, and wherein thereafter in a second step the second evaluation unit with the image processing method operating on the basis of artificial intelligence is trained on site with the specific training data set.

2. The method according to claim 1, wherein the training of the second evaluation unit is performed with lower priority than the capture of the containers by the inspection unit and/or the inspection of the camera images by the first evaluation unit, in order to use unused resources of a computer system during the inspection.

3. The method according to claim 1, wherein a recognition performance of the second evaluation unit is determined on the basis of a verification data set, and if the recognition performance exceeds a predetermined threshold value, the camera images are then inspected for the faults by the second evaluation unit using the image processing method operating on the basis of artificial intelligence.

4. The method according to claim 3, wherein the camera images are inspected by the second evaluation unit instead of the first evaluation unit.

5. The method according to claim 3, wherein the camera images are additionally inspected by the first evaluation unit in parallel with the second evaluation unit so as to capture faults still unknown to the image processing method operating on the basis of artificial intelligence with aid of the conventionally operating image processing method.

6. The method according to claim 5, wherein the camera images with containers having the unknown faults are classified as further fault images and the unknown faults are correspondingly assigned to the further fault images as further fault markings, wherein the further fault images and the further fault markings are compiled as a further specific training data set, and wherein the further specific training data set is used to train the second evaluation unit on site with the image processing method operating on the basis of artificial intelligence.

7. The method according to claim 5, wherein an evaluation sensitivity of the first evaluation unit is reduced or set to default parameters to prevent false rejections.

8. The method according to claim 1, wherein the faulty containers are sorted out from the container mass flow.

9. A device for optically inspecting containers in a drinks processing system for carrying out the method according to claim 1, the device comprising:
the transporter for transporting the containers as the container mass flow,
the inspection unit arranged in the drinks processing system in order to capture the containers as camera images, and
the first evaluation unit that is configured to inspect the camera images for faults using the conventionally operating image processing method, wherein
a classification unit is configured to classify the camera images with faulty containers as fault images and to assign the faults correspondingly as fault markings to the fault images, to classify the camera images with containers found to be good as fault-free images, and to compile the fault images, the fault markings and the fault-free images as the specific training data set, and
the second evaluation unit is configured to perform the image processing method operating on the basis of artificial intelligence and to use the specific training data set to train the image processing method operating on the basis of artificial intelligence on site.

10. The device according to claim 9, wherein the second evaluation unit is configured to inspect the camera images for the faults using the image processing method operating on the basis of artificial intelligence.

11. The device according to claim 9, wherein the device is arranged in the drinks processing system.

12. The device according to claim 9, wherein the device comprises a computer system including the first evaluation unit and the second evaluation unit.

\* \* \* \* \*